United States Patent [19]
Sautter, Jr.

[11] Patent Number: 5,848,819
[45] Date of Patent: Dec. 15, 1998

[54] CONVERTIBLE TOPSTACK WITH EXTRUDED & AJUSTABLE SIDE RAILS

[75] Inventor: Robert H. Sautter, Jr., Jackson, Mich.

[73] Assignee: Dura Convertible Systems, Inc., Adrian, Mich.

[21] Appl. No.: 800,253

[22] Filed: Feb. 13, 1997

Related U.S. Application Data

[63] Continuation-in-part of Ser. No. 636,378, Apr. 23, 1996, abandoned.

[51] Int. Cl.$^6$ ........................................................ B06J 7/00
[52] U.S. Cl. ...................................... 296/107.07; 296/116
[58] Field of Search ................................ 296/107.07, 116, 296/118, 146.9, 146.14, 146.15, 146.16, 93; 52/208, 204.591, 204.597

[56] References Cited

U.S. PATENT DOCUMENTS

| | | | |
|---|---|---|---|
| 2,620,233 | 12/1952 | Doty | 296/116 |
| 2,746,791 | 5/1956 | Gosselin | 296/107 |
| 3,036,859 | 5/1962 | Adamski | 296/116 |
| 3,381,996 | 5/1968 | Horan | 296/107 |
| 4,729,593 | 3/1988 | Nisiguchi et al. | 296/154 |
| 5,269,582 | 12/1993 | Muller et al. | 296/135 |
| 5,427,429 | 6/1995 | Pointek et al. | 296/118 |
| 5,445,426 | 8/1995 | Koehler et al. | 296/107 |
| 5,527,583 | 6/1996 | Nozaki et al. | 428/99 |
| 5,540,475 | 7/1996 | Kersting et al. | 296/100 |

*Primary Examiner*—Jesus D. Sotelo
*Attorney, Agent, or Firm*—David A. Greenlee

[57] ABSTRACT

A vehicle convertible topstack comprises transverse bows and a header supported by spaced, articulated pivotally-interconnected front, center and rear side rails. The front and center side rails are aluminum extrusions each having a right-angle triangular hollow cross section in one embodiment. A C-shaped channel is formed on each triangle's outer hypotenuse and has inwardly-turned, facing flanges for mechanically retaining elongated window seals. The rear rail has a vertical I-shape, and can include a similar window seal retainer. In another embodiment, the front, center and rear rails each have a base and a C-shaped external seal retainer formed on a vertical leg, which forms a slot for receiving a wedge-shaped shims to adjust the angle of the leg and seal to the main body. The shims are formed of frangible sections that can be broken at the top of the slot to remove excess shim material. The vertical leg on both embodiments includes a thickened section having an outer groove for locating self-drilling and self-tapping screws which are used to attach stamped hinges and brackets which connect the rails and the bows. This improves dimensional control which enables a better fit of the topstack on the vehicle.

20 Claims, 6 Drawing Sheets

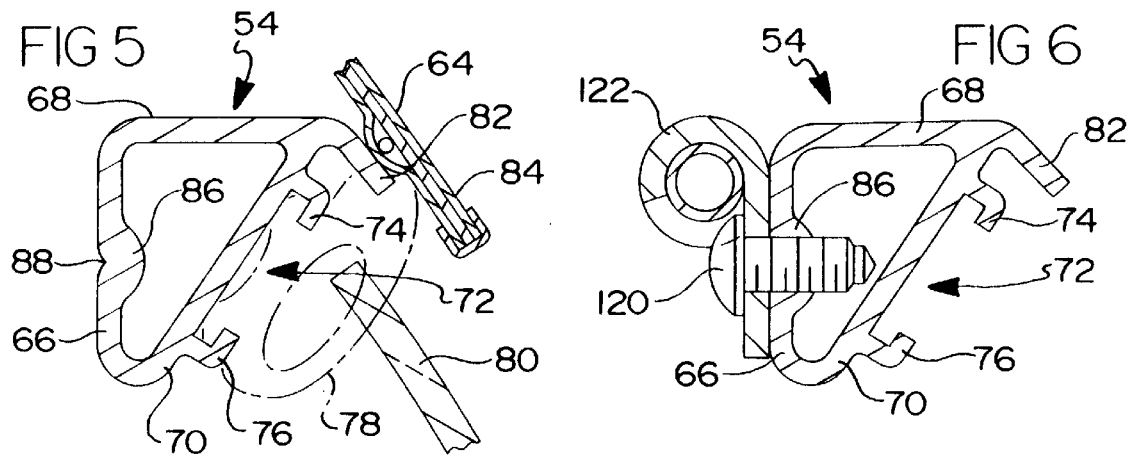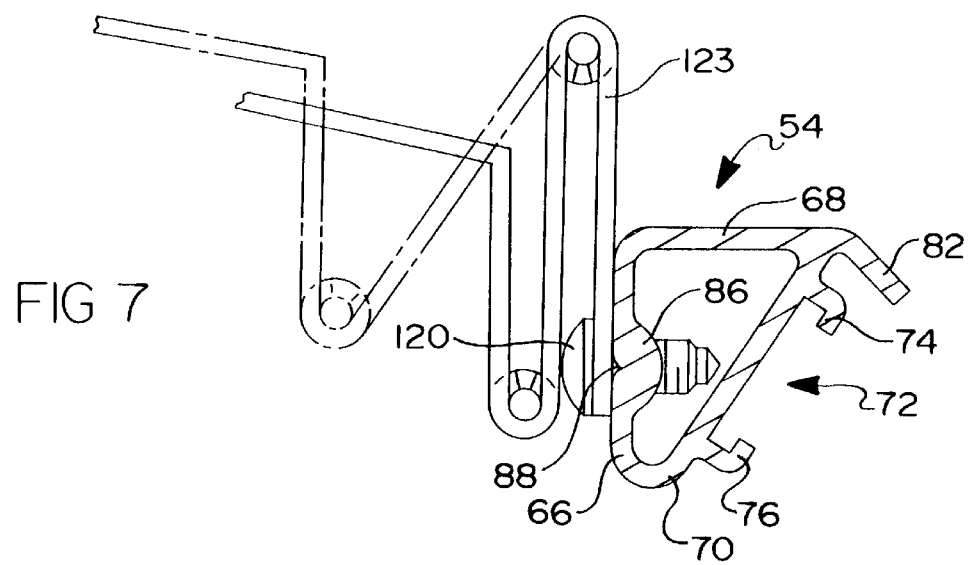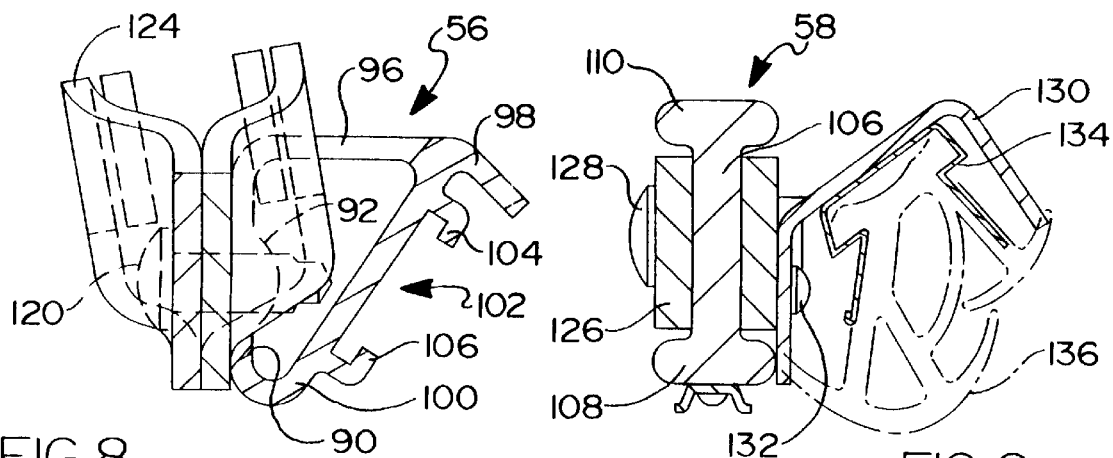

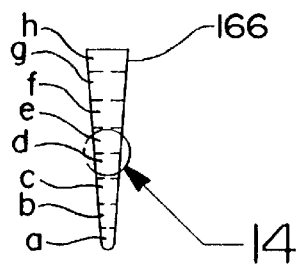
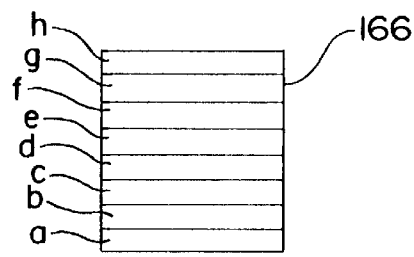
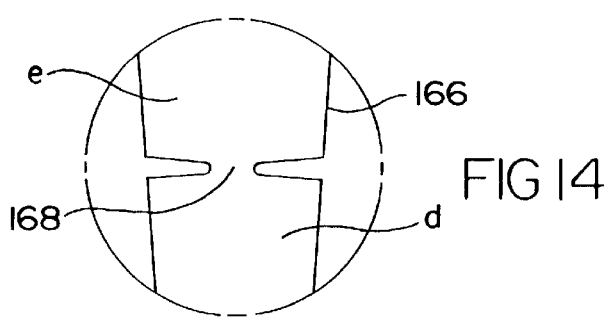
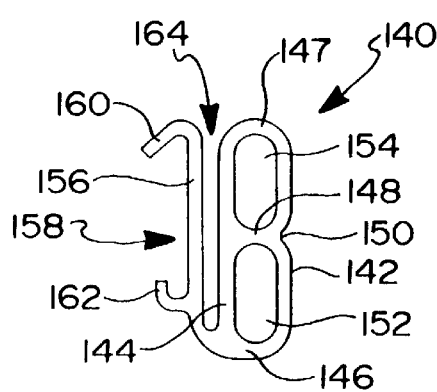
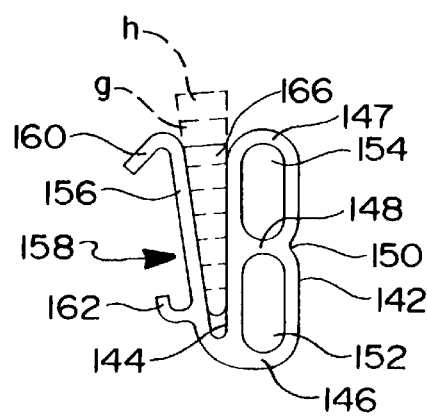

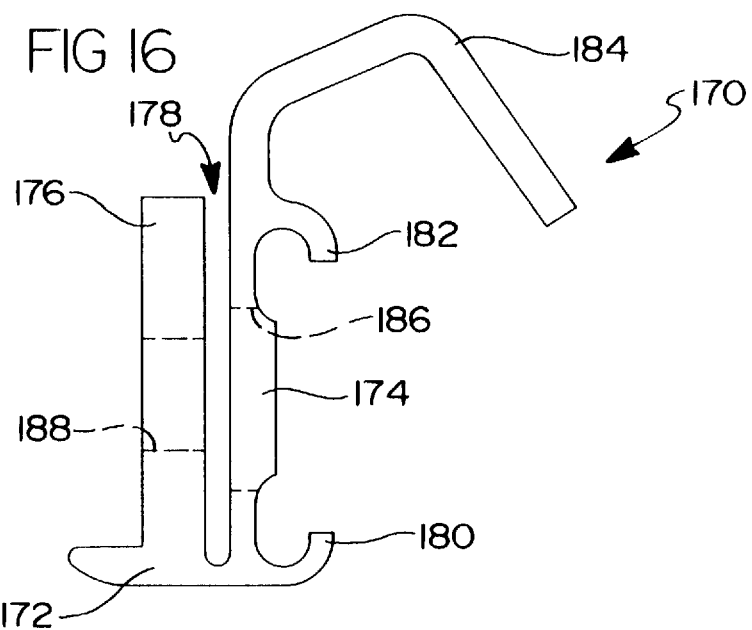
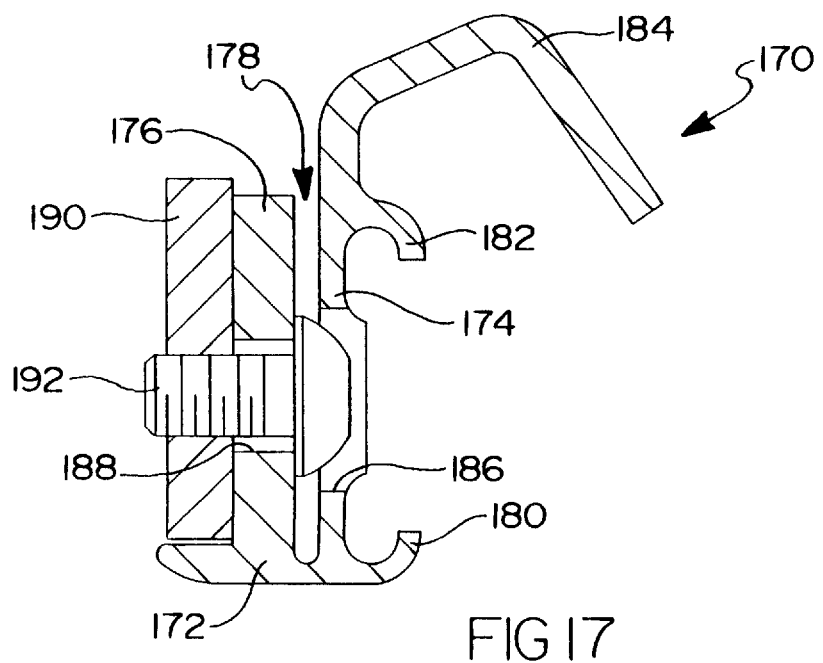

CONVERTIBLE TOPSTACK WITH EXTRUDED & AJUSTABLE SIDE RAILS

This application is a continuation-in-part of application Ser. No. 08/636,378, filed Apr. 23, 1996, now abandoned.

BACKGROUND OF THE INVENTION

This invention relates generally to vehicle convertible tops and, more particularly, to a topstack incorporating improved side rails.

Vehicle convertible tops comprise an articulated topstack which supports a fabric cover. The topstack comprises a transverse header and longitudinally-spaced transverse bows which are supported by spaced articulated side linkages comprising pivotally interconnected front, center and rear side rails. The fabric cover, window seals and decorative trim strips are mounted on these rails.

American convertible topstacks conventionally use stamped steel or cast aluminum side rails, while European convertible topstacks normally utilize forged steel side rails. Retainer clips for the seals and top cover are conventionally attached to these cast, stamped or forged side rails by screws. In addition, connecting hinges and bow-mounting hardware are screwed or welded to the side rails.

The stamping process which forms the side rails and the drilling of the screw holes introduce added dimensional variances, which exacerbates the problem of producing a topstack within dimensional tolerances. Screwing these attachments to the side rails requires elaborate fixturing to assure that dimensional tolerances are maintained. Even then, tolerance stackup can cause substantial dimensional variances from vehicle to vehicle, and makes dimensional control difficult. When welding is used to make these attachments, the heat inherent in the welding process further exacerbates the dimensional problems. Dimensional control by holding tolerances is very important in providing a good seal between the top and the side windows, a good top fit on the vehicle, and geometric alignment to enable the top to fold as designed.

As a result, both the American and European topstacks are expensive to manufacture, complicated to assemble, and require time-consuming seal adjustment. In addition, in an era when vehicle weight is critical, these topstacks are heavy.

Therefore, it would be desirable to provide an improved side rail arrangement for convertible topstacks which is less expensive to manufacture, easier to assemble, lighter in weight, and provides easier seal adjustment than current conventional topstacks.

More specifically, it would be desirable to provide a topstack having improved dimensional control to provide a better fit of the top on the vehicle.

SUMMARY OF THE INVENTION

It is therefore an object of this invention to provide an improved side rail arrangement for convertible topstacks which is less expensive to manufacture, easier to assemble, lighter in weight, and provides easier seal adjustment than current conventional topstacks.

It is another object to provide a topstack having improved dimensional control to provide a better fit of the top on the vehicle.

In one aspect, this invention features a vehicle convertible topstack comprising a transverse header and longitudinally-spaced transverse bows which are supported by spaced articulated side linkages comprising pivotally interconnected front, center and rear side rails, wherein the side rails are each a lightweight metal extrusion, preferably aluminum.

In another aspect, this invention features a topstack which includes front and center rail extrusions that are each formed with an external C-shaped channel having inwardly-turned, facing flanges for mechanically retaining an elongated resilient window seal.

In one embodiment, this invention features a topstack wherein the front and center rails each have a hollow generally right-angle triangular cross-section comprising vertical and horizontal legs joined by a hypotenuse, and with the C-shaped channel formed on the hypotenuse.

In another embodiment of this invention, one of the rail extrusions comprises a main body having a vertical leg extending outwardly and upwardly from the bottom of the main body, which mounts the C-shaped channel, and forms a slot with the rail main body. A wedge-shaped shim is adjustably receivable in the slot to vary the angle of the slot to wedge the flange away from the main body to adjust the position of the seal relative to the main body.

Preferably, the front and center rails each have a generally uniform wall thickness except for a thickened longitudinal vertical wall section, and include a fastener-locating groove formed on the exterior of the vertical wall at the thickened section.

In a further aspect of this invention the articulated side linkages include hinges interconnecting the front and center side rails, the hinges each comprising pivotally interconnected stamped metal links that are attached to the respective front and center side rails by self-tapping screws driven into the rails along the fastener-locating grooves.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 5 is a sectional view, taken along line 5—5 of FIG. 3;

FIG. 6 is a sectional view, taken along line 6—6 of FIG. 4;

FIG. 7 is a sectional view, taken along line 7—7 of FIG. 4;

FIG. 8 is a sectional view, taken along line 8—8 of FIG. 4;

FIG. 9 is a sectional view, taken along line 9—9 of FIG. 4;

FIG. 10 is a partial exploded perspective, illustrating attachment of a stamped hinge to a side rail;

FIG. 11 is a sectional view of another embodiment of a side rail incorporating an adjustment feature according to this invention;

FIG. 12 is an end view of a shim used to adjust the side rail of FIG. 11;

FIG. 13 is a side view of the shim off FIG. 12;

FIG. 14 is an enlarged detail view of the circled portion of FIG. 12;

FIG. 15 is a sectional view illustrating operation of the shim of FIGS. 12–14 to adjust the side rail of FIG. 11;

FIG. 16 is an end view of another embodiment of a rear rail incorporating an adjustment feature according to this invention; and FIG. 17 is a sectional view of the rear rail of FIG. 16, illustrated attached to a rear rail extension.

DETAILED DESCRIPTION OF PREFERRED EMBODIMENTS

Figure 1:
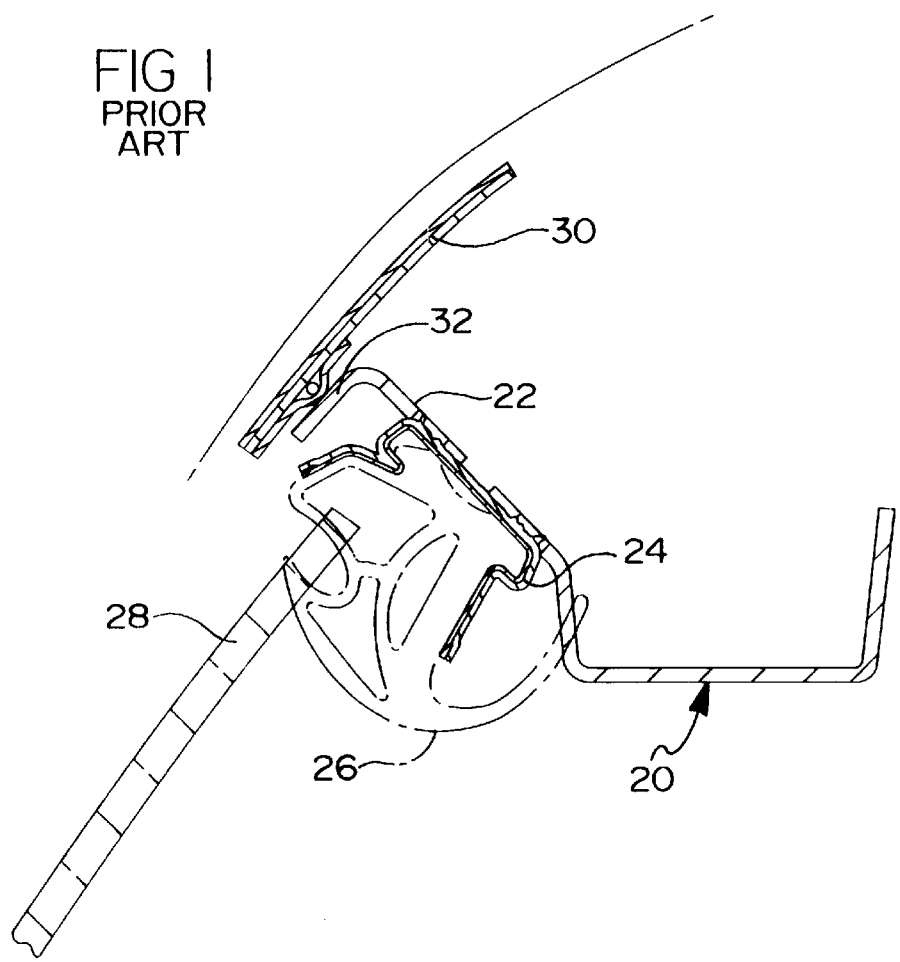
FIG. 1 is a sectional view of a prior art front side rail.

As shown in FIG. 1 of the drawings, a front side rail 20 of a contemporary convertible vehicle is a stamped steel member having an outwardly extending leg 22 which has a seal-mounting clip 24 screwed to it. Clip 24 mounts a rubber extruded seal 26 for sealing the upper edge of a vehicle side window 28. The lower side edge 30 of the convertible top cover rests against the outer leg 32 of rail 20.

Figure 2:
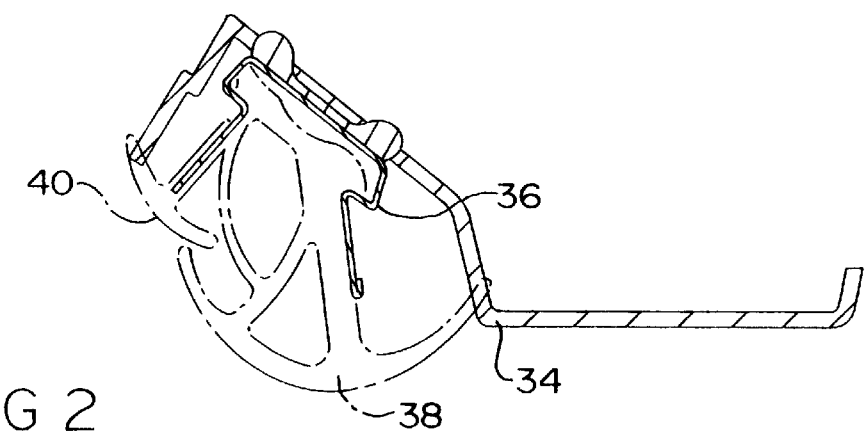
FIG. 2 is a sectional view of prior art rear side rail.

FIG. 2 illustrates a stamped metal rear rail 34 of the same convertible vehicle top. It mounts a seal-mounting clip for securing an extruded rubber seal 38 and a trim strip 40. Both rails 20 and 34 are large stamped pieces to which are screwed the seal mounting clips 24 and 36. Hinges interconnecting these rails are conventionally welded to the rails, as are other hardware, such as bow attachment hardware. As previously noted, welding heats the rails which results in heat distortion and dimensional variations.

Figure 3:
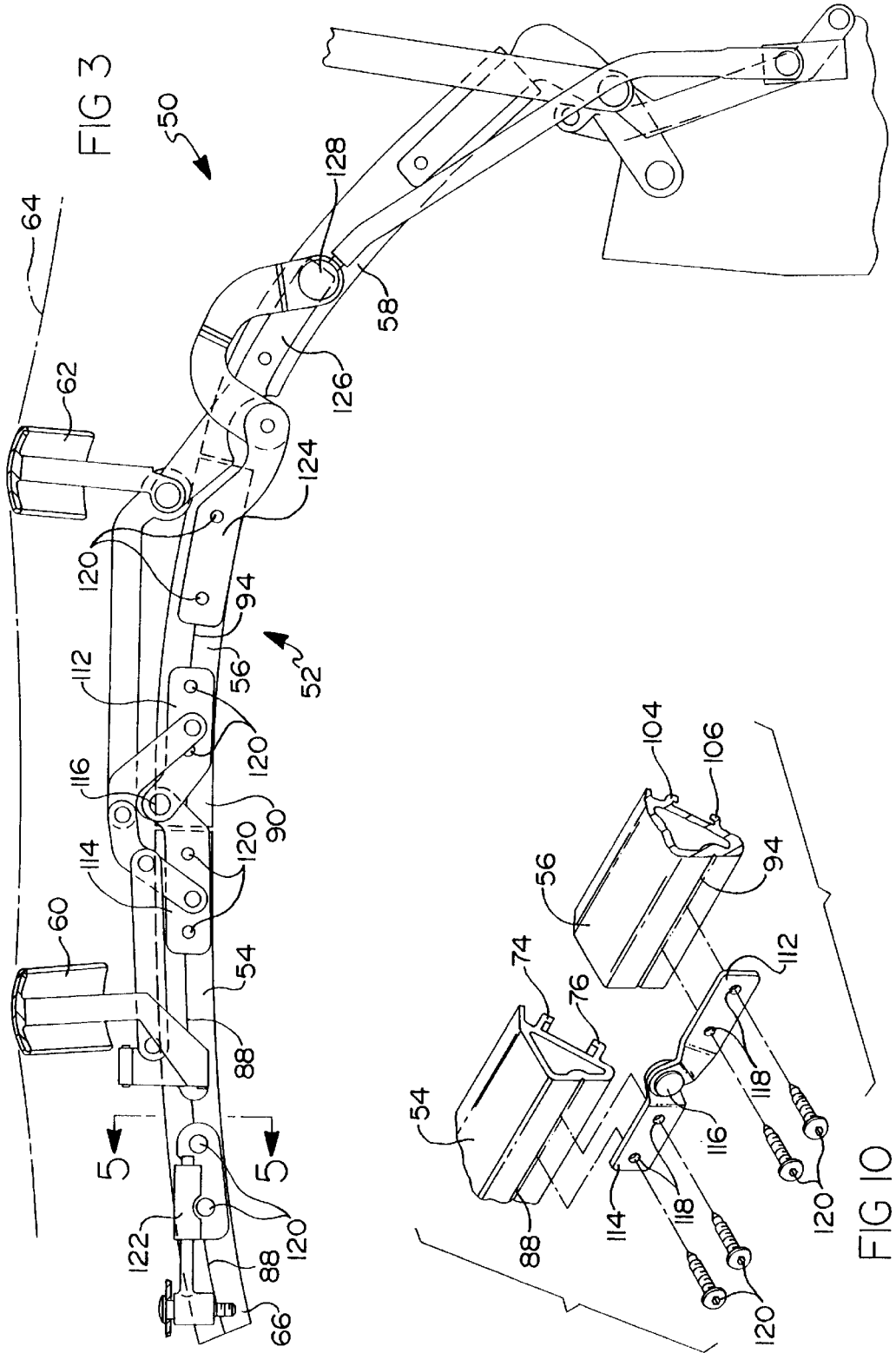
FIG. 3 is a side view of a convertible topstack incorporating one embodiment of side rails according to this invention.
Figure 4:
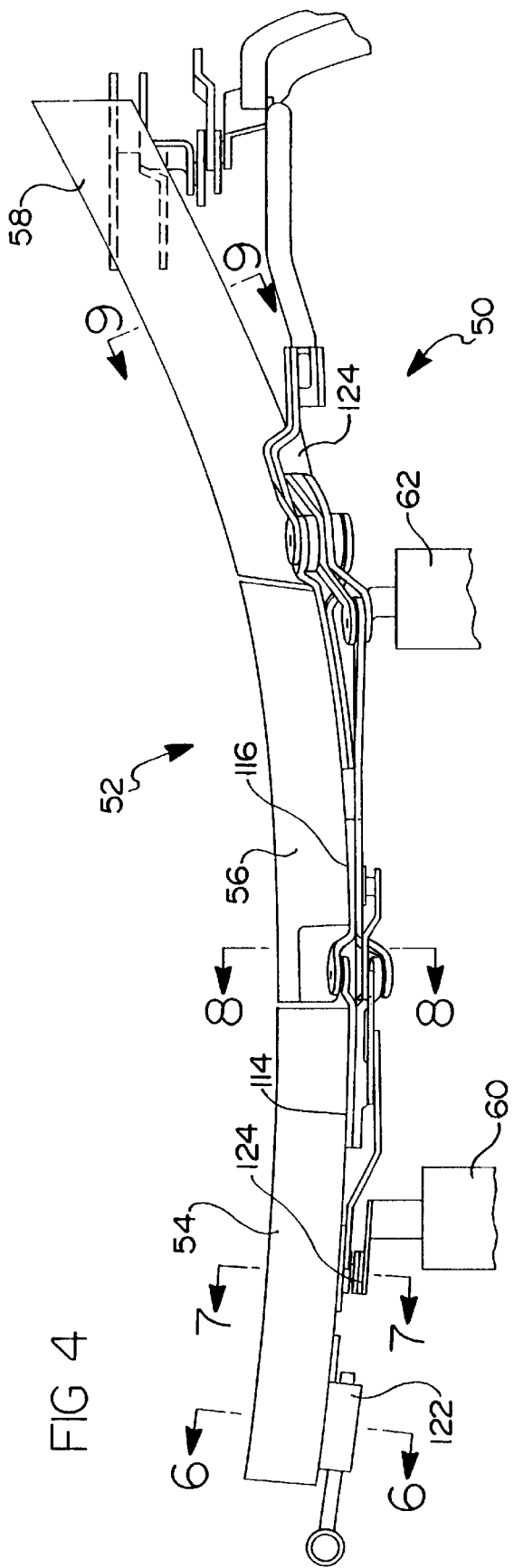
FIG. 4 is a top view of the convertible topstack shown in FIG. 3.

Referring now to FIGS. 3 and 4, a convertible topstack 50 comprises a pair (only one shown) of spaced articulated side linkages 52 that comprise a front side rail 54, a center side rail 56 and a rear side rail 58, as is conventional. These side rails are interconnected by a transverse header (not shown) and a plurality of spaced bows, only two of which, denoted 60 and 62 are illustrated, that support a top cover 64.

As shown in FIGS. 5–7, front rail 54 is an extruded member formed of a lightweight metal, preferably aluminum, that has a generally hollow, right-angle triangular cross-section comprising an inside vertical leg 66 and a top horizontal leg 68 joined by an external hypotenuse 70. A C-shaped channel 72 is formed on hypotenuse 70 by a pair of inwardly turned, facing flanges 74 and 76. A window seal 78 is retained within flanges 74 and 76 for engagement by a vehicle side window 80. An extension 82 of top leg 68 extends outwardly for engagement by the lower side edge 84 of top cover 64. Inside leg 66 includes a longitudinal enlarged section 86 that includes an external longitudinal locating groove 88.

As shown in FIG. 8, center rail 56 is similarly configured. Here, an inside vertical leg 90 has a longitudinal enlarged section 92 which has a longitudinal locating groove 94 (see FIG. 3). A vertical top leg 96 has extension 98 for engaging the top cover, and external hypotenuse 100 mounts C-shaped channel 102 defined by flanges 104 and 106.

Rear rail 58 is differently shaped, as seen in FIG. 9. It comprises an I-shape having a vertical leg 106 mounting a bottom leg 108 and top leg 110.

Rails 54, 56 and 58 are formed of segments cut from extruded aluminum sections. After they are cut to shape, the extruded sections are bent to a shape dictated by top geometry.

Front rail 54 and central rail 56 are interconnected by a hinge comprising stamped metal links 112 and 114 which are pivoted together by a pivot rivet 116 and have mounting holes 118. FIG. 10 illustrates the assembly of the hinge to rails 54 and 56. The rails are placed in a fixture (not illustrated) in desired relationship, the hinge is located atop the rails, and driving self-drilling and self-tapping screws 120 through holes 118 into locating grooves 88 and 94. The grooves 88 and 94 serve to locate screws 120 for proper alignment of the hinge on the rail sections, while the enlarged sections 86 and 92 reinforce the rails at the points of screw insertion. This arrangement improves dimensional control by eliminating the tolerances necessitated by the conventional use of pre-drilled holes in the hinges and side rails.

Other elements of topstack 50 are assembled in a similar manner. A header-mounting assembly 122 is mounted on front side rail 54 by driving self-tapping screws 120 into groove 88. A linkage 123, which mounts bow 60, is similarly mounted to front side rail 54 (FIG. 7). A control arm bracket 124 is secured to center side rail 56 by self-tapping screws 120.

Rear side rail 58 contains no enlarged longitudinal section or locating groove. A bracket 126 is secured to rear side rail 58 through drilled or pierced holes (not shown) which receive fasteners such as rivets or bolts 128. The bracket is self-locating by confinement between rail legs 108 and 110. A seal mounting bracket 130 is riveted at 132 to bracket 126, and mounts a clip 134 which retains a window seal 136.

Another, preferred embodiment of the front and center side rails is shown in FIGS. 11–15. The preferred form of front and center side rail 140 comprises an aluminum extruded body having an inner vertical wall 142 and an outer vertical wall 144 that are connected by a base or bottom wall 146 and a top wall 147. An intermediate wall 148 backs a longitudinal screw locating groove 150 and forms lower and upper hollow chambers 152 and 154, giving rail 140 a FIG. 8 shape. An external vertical leg 156 extends outwardly and upwardly from the bottom wall 146 and forms an external C-shaped channel 158 having inwardly-turned, facing upper and lower flanges 160, 162 for mechanically retaining a window seal.

Leg 156 and outer wall 144 form a slot 164. As shown in FIG. 15, at least one wedge-shaped shim 166 is insertable in slot 164 to change the angle of the slot by wedging leg 156 away from outer wall 144. This variably positions the seal relative to rail 140 to provide an outward adjustment of the seal (not shown) in channel 158 relative to the convertible top.

Shim 166 comprises a plurality of progressively larger, tapered sections a, b, c, d, e, f, g and h, which are connected by narrow bands frangible 168 (FIG. 14). This structure enables shim 166 to be inserted into slot 164 until the desired angle between wall 144 and leg 156. The excess shim sections extending from slot 164 (sections g and h in FIG. 15) can than be easily broken off and discarded to completely hide shim 166.

Another, preferred embodiment of the rear rail is shown in FIGS. 16 and 17, where rear rail 170 is an aluminum extruded member having a base 172. An upstanding leg 174 and a main body 176 extend upwardly from base 172 to form a V-shaped slot 178. Leg 174 has spaced lower and upper flanges 180 and 182 which form a seal-retaining channel, as described above.

An extension 184 of leg 174 extends outwardly and downwardly for engagement by the lower side edge the top cover, as described above with reference to FIG. 5. Leg 174 has spaced holes 186 (only one illustrated) which align with smaller holes 188 formed in main body 176.

Main body 176 is easily attached to a rail extension 190, which is a stamped, cast or forged steel piece that attaches to the rear rail pivots. As shown in FIG. 17, holes 186 and 188 enable passage of a self-tapping screw 192 to threadedly engage rail extension 190. This clamps rear rail 170 to extension 192.

As described in detail above, insertion of a shim into slot 178 will variably angle leg 174 relative to main body 176. This adjustably positions the seal confined by flanges 180, 182, to accommodate vehicle build tolerances and dimensional variances.

The use of the extruded side rails shown in FIGS. 11 and 16 enables accurate positioning of convertible top seals without the requirement to use added clips, thus simplifying the convertible top structure and its assembly.

While only preferred embodiments have been illustrated and described, obvious modifications thereof are contemplated within the scope of this invention and the following claims.

We claim:

1. A vehicle convertible topstack comprising longitudinally-spaced transverse bows which are supported by spaced articulated side linkages comprising pivotally interconnected front, center and rear side rails, wherein the side rails are each a lightweight metal extrusion.

2. The topstack of claim 1, wherein the lightweight metal is aluminum.

3. The topstack of claim 1, including an elongated resilient window seal for engaging a vehicle side window, wherein the front and center rail extrusions are each formed with an external C-shaped channel having inwardly-turned, facing flanges for mechanically retaining the window seal.

4. The topstack of claim 3, wherein the front and center rail extrusions each have a hollow cross-section.

5. The topstack of claim 4, including an elongated resilient window seal for engaging a vehicle side window, wherein the front and center rail extrusions each comprise a hollow main body having an external vertical leg extending outwardly and upwardly from the bottom of the main body and forming an external C-shaped channel having inwardly-turned, facing flanges for mechanically retaining the window seal, the leg and main body forming a slot, and at least one wedge-shaped shim adjustably receivable in the slot to vary the angle of the slot to variably position the leg and seal relative to the main body.

6. The topstack of claim 5, wherein each shim comprises interconnected frangible sections which enable insertion of a shim into the angled slot sufficiently to achieve a desired slot angle position and, thereafter, removal of the sections of the shim extending outside the slot.

7. The topstack of claim 4, wherein the front and center rails each have a generally hollow cross-section comprising oval segments having vertical walls joined centrally by a horizontal web.

8. The topstack of claim 7, wherein the front and center rails each include a fastener-locating groove formed on the exterior of the inner vertical leg at the horizontal web.

9. The topstack of claim 3, wherein the front and center rails each have a generally right-angle triangular cross-section comprising vertical and horizontal legs joined by an external hypotenuse, and with the C-shaped channel formed on the hypotenuse.

10. The topstack of claim 9, wherein the front and center rails each have a generally uniform wall thickness except for a thickened section intermediate the ends of the vertical leg, and including a fastener-locating groove formed on the exterior of the vertical leg at the thickened section.

11. The topstack of claim 10, wherein the rear rail has a vertical I-shaped cross-section.

12. The topstack of claim 11, wherein the rear rail comprises a main body and a leg extending from a base to form a slot, and an external C-shaped channel on the leg having inwardly-turned, facing flanges for mechanically retaining the window seal on the leg.

13. The topstack of claim 2, wherein the extrusion has a hollow cross-section.

14. The topstack of claim 13, wherein the front and center rails each have a generally uniform wall thickness except for a thickened section intermediate the ends of the vertical leg, and including a fastener-locating groove formed on the exterior of the vertical leg at the thickened section.

15. The topstack of claim 14, wherein the articulated side linkages include hinges interconnecting the front and center side rails, the hinges each comprising pivotally interconnected stamped metal links that are attached to the respective front and center side rails by self-tapping screws driven into the rails along the fastener-locating grooves.

16. The topstack of claim 15, wherein attachments to the front and center side rails are attached by self-tapping screws driven into the side rails along the fastener-locating grooves.

17. A vehicle convertible topstack comprising longitudinally-spaced transverse bows which are supported by spaced articulated side linkages comprising pivotally interconnected front, center and rear side rails, wherein the side rails are each a lightweight metal extrusion having a main body and a leg extending from a base to form a slot, and at least one wedge-shaped shim adjustably receivable in each rail slot to vary the angle of the slot to variably position the leg relative to the main body.

18. The topstack of claim 17, wherein the side rail legs each have an external C-shaped channel with inwardly-turned, facing flanges for mechanically retaining a window seal, so that insertion of the shims into the slots adjust the position of the seal relative to the convertible top.

19. A vehicle convertible topstack comprising longitudinally-spaced transverse bows which are supported by spaced articulated side linkages comprising pivotally interconnected front, center and rear side rails, wherein the side rails are each a lightweight metal extrusion having a main body and a leg extending from a base to form a variably-angled slot, and an adjustment member adjustably insertable into each such slot to vary the angle of the slot to variably position the leg relative to the main body.

20. The topstack of claim 19, wherein the side rail legs each have an external C-shaped channel with inwardly-turned, facing flanges for mechanically retaining a window seal, so that insertion of the shims into the slots adjust the position of the seal relative to the convertible top.

* * * * *